United States Patent Office 3,130,645
Patented Apr. 28, 1964

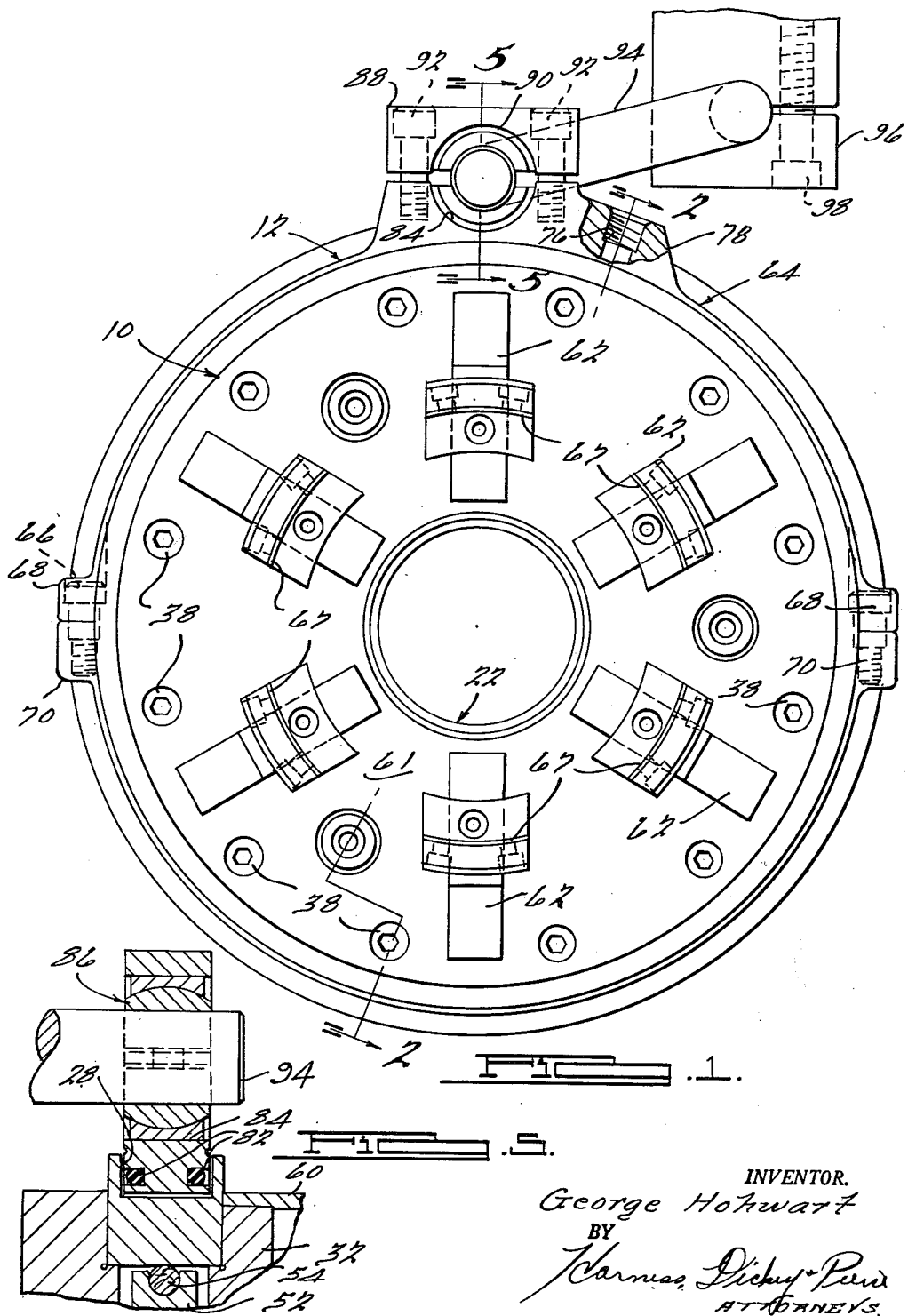

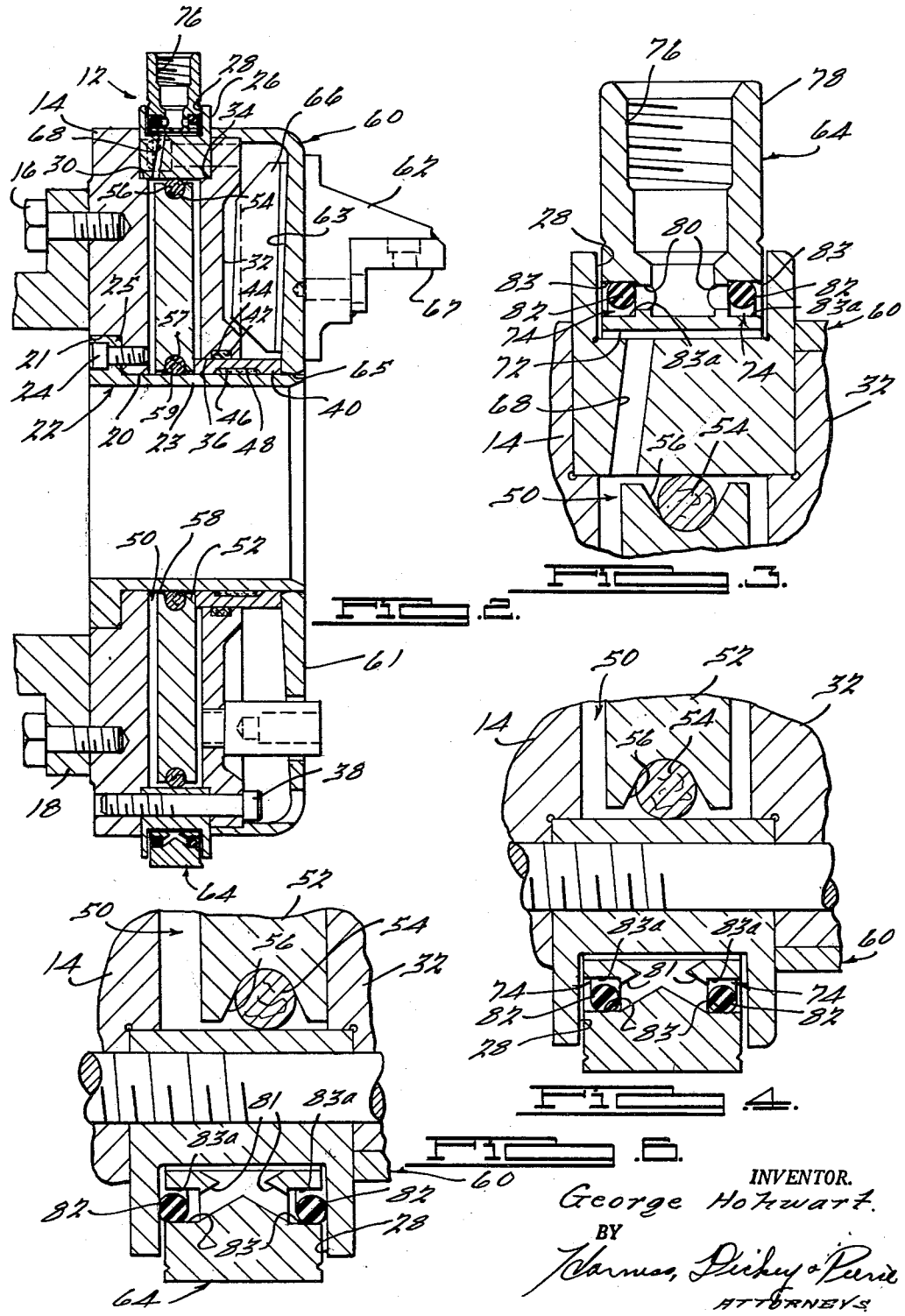

3,130,645
SLIP RING
George Hohwart, Farmington, Mich., assignor to N. A. Woodworth Company, Ferndale, Mich., a corporation of Michigan
Filed May 29, 1961, Ser. No. 113,380
10 Claims. (Cl. 91—442)

This invention relates to apparatus for providing a fluid seal and more specifically to apparatus for providing a pneumatic seal between different members.

The novel sealing apparatus of this invention is usable with a diaphragm type chuck. In general, a diaphragm chuck has a resilient member with chuck jaws attached thereto and is actuated by means of air pressure which causes the resilient member to flex such as to disengage a workpiece held in the chuck jaws. Upon removal of the workpiece and insertion of a new workpiece in the chuck jaws, the air pressure is released and the resilient member automatically springs back to its original position gripping the new workpiece. In some instances, the diaphragm chuck is used to hold work which must extend through the center of the chuck or even into and through the machine spindle on which the chuck is mounted. Difficulty has been encountered, however, in applying air pressure to a diaphragm chuck for such use; usually some type of stationary slip ring is utilized which has means for fluid communication with the rotatable diaphragm type chuck through its outer periphery. With such a slip ring, some means of sealing between the slip ring and diaphragm type chuck is required in order that the fluid (air) under pressure can be transmitted. One method used in the past provides a seal on the stationary slip ring which is constantly in contact with the rotating parts. A disadvantage of this method, however, is that such contact results in wear, requiring the eventual replacement of the seal. It should be noted that, since, in practice, the diaphragm type chuck is actuated by air only when it is no longer rotating, it would be desirable to provide sealing apparatus in which the seal could be selectively brought into contact with the movable member when that member stopped rotating.

It is, therefore, an object of this invention to provide a pneumatic seal for use with a slip ring in conjunction with a diaphragm type chuck whereby rotational wear of the seal is eliminated.

It is another object of this invention to provide a simple and inexpensive fluid seal for use between a slip ring and a rotatable, pressure actuable member.

It is still another object of this invention to provide a novel fluid sealing means for sealing between two faces.

Further objects, features and advantages of this invention will become apparent from a consideration of the following description, the appended claims and the accompanying drawing in which:

FIGURE 1 is a front elevational view of a diaphragm type chuck assembly shown in conjunction with a slip ring assembly providing a fluid seal in accordance with the present invention.

FIGURE 2 is a sectional view of the apparatus of FIG. 1 taken substantially along the line 2—2 in FIG. 1.

FIGURE 3 is a fragmentary blown up sectional view of a portion of the apparatus as shown in FIGURE 2.

FIGURE 4 is a fragmentary blown up sectional view of a different portion of the apparatus as shown in FIGURE 2.

FIGURE 5 is a fragmentary sectional view taken substantially along the line 5—5 in FIGURE 1.

FIGURE 6 is a view of the apparatus as shown in FIGURE 4 while the diaphragm type chuck assembly is under fluid pressure.

More specifically now and looking to FIGURE 1, a rotatable diaphragm chuck assembly 10 is shown in conjunction with a stationary slip ring assembly 12, and comprises a circular adapter plate 14 secured by a plurality of bolts 16 to a rotatable spindle 18. The adapter plate 14 (FIG. 2) has a centrally disposed bore 20 which is concentric with a counterbore 21 in the rear face thereof; a hub member 22 having a portion 23 matably disposed within the bore 20 and axially extending beyond the front face of the plate 14, has a flange portion 25 matable with the counterbore 21 and is fixedly secured to the plate 14 by means of a plurality of bolts 24 engageable with the flange 25 and plate 14. An annular ring 26 having a generally rectangular radially outwardly backing annular groove 28 in its outer periphery is matably disposed with one side about an annular shoulder 30 located on the forward face of the adapter plate 14. A circular backing plate 32 has an annular shoulder 34 engageable with the other side of the annular ring 26 and has a centrally disposed bore 36 which is concentric with and greater in diameter than the external diameter of the axial portion 23 of the hub 22. The assembly comprising the backing plate 32 and the annular ring 36 is secured to the adapter plate 14 by means of a plurality of studs 38.

An annular sleeve member 40 is disposed in the gap between the bore 36 of the backing plate 32 and the hub 22 and is axially movable therein. A lubricant 42 is disposed in an annular lubrication groove 44 in the surface defining the bore 36 in the backing plate 32 for providing lubrication between the backup plate 32 and the sleeve member 40. The sleeve member 40 in turn has a lubricant 46 disposed in an internally located annular lubrication groove 48 for providing lubrication between the movable sleeve 40 and the hub member 22. In essence then, the hub 22, the movable sleeve 40, the backing plate member 32, the annular ring member 26, and the adapter plate 14 define an enclosed cylinder 50 in which is disposed an axially movable circular piston member 52. The piston member 52 has a seal member 54 disposed in an annular groove 56 in the outer periphery for providing a fluid seal between the piston 52 and the surface defining the internal diameter of the annular ring 26. The piston 52 has a centrally disposed bore 58 having an annular sealing member 59 disposed in an annular groove 57 located therein for providing a fluid seal between the external surface of the axial portion 23 of the hub member 22 and the surface defining the internal diameter of the bore 58 of a piston member 52. The piston member 52 has its forward face at the central portion adjacent the bore 58 in contact with the movable sleeve member 40 for a purpose to be described. A passageway 68 extending radially through the annular ring 26 fluid communicates the rectangular groove 28 and that portion of cylinder 50 on the rearward side of the piston 52.

A diaphragm 60 is of a cup-shaped type disclosed in U.S. Patent No. 2,403,599 issued July 9, 1946, and is positioned concentrically with respect to the chuck with its open side facing rearwardly and piloted over the periphery of the backing plate 32 to which it may be secured in any suitable manner i.e. preferably welded or brazed. On a forward face 61 of the diaphragm 60 is secured a plurality of jaw assemblies 62 for gripping a workpiece; the jaw assemblies can be welded, brazed or otherwise secured to the face 61 of the diaphragm 60. The individual ones of the jaw assemblies 62 could be made adjustable. Each of the plurality of jaw assemblies 62 is provided with a jaw face 67 secured to the jaw assembly 62 with which it is individual by bolts or other means. Each of a plurality of counterweights 66 are secured to the rearward face 63 of the diaphragm member 60 in axial alignment with each jaw assembly 62 for a purpose to be described. A centrally disposed bore 65 in the diaphragm member 60 extends about the axial portion 23 of the hub 22 such that the sleeve 40 is engageable with the rearward face 63 at the central portion adjacent the bore 65.

In general, the entire chuck assembly 10 is rotatable by means (not shown) related to the spindle 18 and a workpiece can be gripped by the plurality of jaws 62. The counterweight 66 offsets the tendency of the centrifugal force acting on the jaw assemblies at high speeds to cause the diaphragm member 60 to flex in a direction to release the grip of the jaws in the workpiece. Upon completion of that particular operation, rotation of the chuck assembly 10 is stopped and fluid pressure, in this case pneumatic, in inserted (by means to be described) through the passageway 68 into a portion of cylinder 50 causing the piston 52 to move axially outwardly. Since the piston 52 is in abutting contact with the movable sleeve member 40, the sleeve member 40 will be moved axially outwardly against the rearward face 63 of the diaphragm 60 causing it to flex outwardly from the bore 65; this flexing causing the jaws 62 to move radially outwardly thereby releasing the workpiece. While the pressure is still maintained, another workpiece can be inserted. Once the pressure is released the resilience of the diaphragm 60 forces the sleeve 40 axially inwardly moving the piston 52 inwardly with the air in the cylinder 50 at that time being free to escape through the aperture 68 to the atmosphere (by means to be described). The new workpiece is then gripped by the jaws 62 and is ready to be machined.

As previously mentioned, the difficulty in the past has been in providing means whereby the fluid pressure can be inserted through the passageway 68 to actuate the diaphragm 60. Means have been used in which the sealing member is stationary relative to and in continuous contact with the chuck jaw assembly. With the old type of design periodic replacement of seal members as a result of wear is required. Such replacement is literally unnecessary with the novel sealing apparatus of the present invention, which is generally shown in conjunction with the slip ring assembly 12.

The slip ring assembly 12 comprises an annular split ring 64 which is diametrically split with the two halves being secured together by means of a pair of bolts 66 engaging a pair of bosses 68 on the one half, and a pair of mating bosses 70 on the other half. The annular ring 64 is of a split construction in order to facilitate the disposition of the slip ring assembly 12 within the annular rectangular groove 28 in the annular ring member 26. The split ring member 64 has an internal diameter 72 (FIGURE 3) which is slightly greater than the root diameter of the rectangular groove 28 and the width of the annular split ring member 64 is just sufficient to allow a slight clearance between the sides of the rectangular annular groove 28.

The annular split ring 64 has a pair of axially opening annular, rectangularly shaped seal retaining grooves 74 on opposite faces of the annular split ring 64 which are disposed at a point on that ring such as to be completely within the volume defined by the rectangular groove 28 in the annular ring 26 and hence face the adjacent walls of the groove 28. In an increased section portion 78, the annular split ring 64 has a radially inwardly extending bore 76 partially threaded and of a configuration to accept a standard fitting whereby fluid pressure can be applied thereto by means well known in the art (not shown). The bore 76 does not pass completely through the split ring 64 but does at its radially inner end communicate with the pair of annular grooves 74 by means of axial passages 80. At a diametrically opposite end of the split annular ring 64, the grooves 74 (see FIG. 4) communicate with the space between the rectangular annular groove 28 in the ring member 26 and the surface defining the internal diameter of the annular split ring member 64 by means of diagonally intersecting passages 81. A pair of O-rings 82 made of rubber or other similar resiliently deformable material, each having a cross-sectional diameter less than the width of the annular grooves 74 and having an outside ring diameter slightly larger than the diameter of the radially outer, axially extending, peripheral surface 83 of the annular rectangular groove 74 are disposed in the groove 74. Thus the O-rings 82 will be assembled under a compressive force in the groove 74 and will tend to bear radially outwardly against the outer peripheral surface or face 83 of the rectangular groove 74. At the same time a gap exists between the O-ring 82 and the radially innermost axially extending face 83a of the rectangular groove 74. The O-rings 82 as disposed in the grooves 74 are in a blocking relationship with reference to the passageways 80 and 81, thus substantially restricting the flow of air through these passages past the O-rings 82.

In operation, the slip ring assembly 12 is maintained stationary while the chuck assembly 10 is free to rotate. To allow this, the increased section portion 78 is provided with a semi-circular groove 84 (see FIG. 5) for receiving a spherical joint assembly 86 which is clamped thereto by means of a block 88 having a semi-circular groove 90. The clamping is accomplished by a pair of cap screws 92 which are engageable with the block 88 and in threadable engagement with the raised portion 78. A crank arm 94 has one portion retained within the spherical joint assembly 86 and another portion fixed to to a part of the apparatus or machine to which the chuck assembly 10 is rotatably secured and is generally designated by the numeral 96. The crank arm 94 is movably secured to the member 96 by means of a split construction shown in which the tightening of a bolt 98 fixes the crank arm 94 in the selected position. Thus the slip ring assembly 12 is located in the rectangular groove 28 and is positionally adjusted by means of the crank arm 94 and the spherical joint assembly 86 until it is in a proper clearance relationship peripherally within the rectangular groove 28 such that the chuck assembly 10 can be rotated without frictionally contacting the slip ring assembly 12. In order to insert a workpiece into the plurality of jaws 62, fluid pressure, in this case air pressure, is applied to the bore 76 by means of an appropriate fitting and a source of pneumatic pressure. The air pressure in the passageways 80 forces the O-rings 82 to roll or deform resiliently axially outwardly on the axial surfaces on which they bear (viz., the outer peripheral surfaces 83 of the grooves 74) and against the opposed radial surfaces defined by the two side walls of the rectangular groove 28 thereby preventing the air from escaping to the atmosphere. The O-rings 82 act as a spring such that the resilient rolling or deformation creates in the O-rings 82 energy tending to move them back to their original positions. However, even though the spaces between the slip ring 12 and the radial sides of the groove 28 are closed by the O-rings 82 air is still free to circulate through the rectangular groove 74 and a portion of the air can enter the gap between the rectangular groove 28 and the internal diameter 72 of the annular split ring 64 via the space on either side of the annular split ring 64 and the sides of the rectangular groove 28. Air circulating around the rectangular groove 74 behind the O-rings 82 can also enter this space by means of the diagonally intersecting passageways 81 (see FIG. 6). The air in this gap is free to enter the portion of the cylinder 50 to the rear of piston 52 via the passageway 68. Pressure in that portion of cylinder 50 causes the piston 52 to move axially outwardly against the movable sleeve member 40 thereby flexing the diaphragm 60 causing the plurality of chuck jaws 62 to open. The jaws are maintained in this position until the workpiece is inserted therein and the air pressure is relieved. With the pressure behind the O-rings 82 removed the O-rings 82 which have been rolled or deformed axially outwardly are now free to resiliently return to their initial positions thereby opening up the space between the sides of the rectangular groove 28 and the sides of the annular ring 64 such that the air is free to escape to the atmosphere. It is important to note that the O-rings do not slide outwardly frictionally but rather roll or deform resiliently in a spring-like manner and that as a result of the resilience of the material itself, upon the removal of the air pressure, they return automatically to the initial position. With the axial force behind the piston 52 removed, the resilient nature of the diaphragm member 60 forces the piston 52 via the sleeve 40 axially rearwardly and the workpiece is securely clamped in the plurality of jaws 62 whereby the chuck assembly 10 can be rotated and the operation performed on the new workpiece.

Note that during rotation of the chuck assembly 10, there is no frictional engagement between any portion of the chuck assembly 10 and the stationary slip ring assembly 12. Thus a novel seal construction has been provided for use with a slip ring and a diaphragm type chuck assembly which is simple, inexpensive and which eliminates the wear problem due to frictional contact between the stationary seals and the rotating chuck assembly.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a rotatable diaphragm type chuck having an enclosed cylinder with a passageway in fluid communication with a radially outwardly facing rectangular annular groove and being operable by pressure in the cylinder from a source of selectively actuable fluid pressure, a stationary slip ring assembly for providing a seal within the rectangular groove comprising an annular diametrically split ring disposed in the rectangular groove and having a pair of annular seal retaining grooves each opening on axial opposite sides towards an adjacent wall of the rectangular groove, means for fixedly securing the diametrical halves of said split ring together, spherical joint means connected to said split ring for providing positional adjustability of said split ring to a clearance relationship in the rectangular groove, means including a pair of axial passages in said split ring each individual to one of said pair of seal retaining grooves for communicating said pair of seal retaining grooves to the source of fluid pressure, said split ring having a pair of diagonally intersecting passages radially displaced from said pair of axial passages for communicating said pair of seal retaining grooves to the clearance gap between said split ring and the root of the rectangular groove, each of a pair of resilient O-rings disposed in one of said pair of seal retaining grooves with an interference fit so as to bear radially outwardly against the radially outermost face of that one of said pair of seal retaining grooves with which it is individual and being in clearance relationship with the radially innermost face of that one of said pair of seal retaining grooves, each of said O-rings disposed in blocking relationship with that one of said pair of axial passages with which it is individual and being deformable out of blocking relationship with that one of said pair of axial passages into sealing contact with the adjacent wall of the rectangular groove for providing a fluid seal between said split ring and the walls of the rectangular groove upon actuation of the source of fluid pressure and resiliently returning to its original position upon deactuation of the source of fluid pressure.

2. In a rotatable diaphragm type chuck having an enclosed cylinder with a passageway in fluid communication with a radially outwardly facing rectangular annular groove and being operable by pressure in the cylinder from a source of selectively applicable fluid pressure, a stationary slip ring assembly for providing a seal within the rectangular groove comprising an annular ring disposed in clearance relationship in the rectangular groove and having a pair of annular seal retaining grooves each opening on axial opposite sides towards an adjacent wall of the rectangular groove, means including a pair of axial passages in said annular ring each individual to one of said pair of seal retaining grooves ofr communicating said pair of seal retaining grooves to the source of fluid pressure, said annular ring having a pair of intersecting passages radially displaced from said pair of axial passages for communicating said pair of annular seal retaining grooves to the clearance gap between said annular ring and the root of the rectangular groove, each of a pair of resilient O-rings disposed in one of said pair of seal retaining grooves with an interference fit so as to bear radially outwardly against the radially outermost face of that one of said pair of seal retaining grooves with which it is individual and being in clearance relationship with the radially innermost face of that one of said pair of seal retaining grooves, each of said O-rings disposed in blocking relationship with that one of said pair of axial passages with which it is individual and being deformable out of blocking relationship with that one of said pair of axial passages into sealing contact with the adjacent wall of the rectangular groove for providing a fluid seal between said annular ring and the walls of the rectangular groove upon actuation of the source of fluid pressure and resiliently returning to its original position upon deactuation of the source of fluid pressure.

3. In a rotatable diaphragm type chuck having an enclosed cylinder with a passageway in fluid communication with a radially outwardly facing rectangular annular groove and being operable by a source of fluid pressure selectively applicable to the cylinder, a stationary slip ring assembly for providing a seal for the rectangular groove comprising an annular ring disposed in clearance relationship in the rectangular groove and having a pair of annular seal retaining grooves each opening on axial opposite sides towards an adjacent wall of the rectangular groove, means including a pair of passages in said annular ring each individual to one of said pair of seal retaining grooves for communicating said pair of seal retaining grooves to the source of fluid pressure, each of a pair of resilient O-rings disposed in one of said pair of seal retaining grooves with an interference fit so as to bear radially outwardly against the radially outermost face of that one of said pair of seal retaining grooves with which it is individual, each of said O-rings disposed in blocking relationship with that one of said pair of passages with which it is individual and being deformable out of blocking relationship with that one of said pair of passages into sealing contact with the adjacent wall of the rectangular groove for providing a fluid seal between said annular ring and the walls of the rectangular groove upon application of the source of fluid pressure and resiliently returning to its original position upon deactuation of the source of fluid pressure.

4. A ring assembly selectively operable with a source of fluid pressure for providing a seal for a member having an annular rectangular groove comprising an annular ring disposed in clearance relationship in the rectangular groove and having a pair of annular seal retaining grooves each opening on axial opposite sides towards an adjacent wall of the rectangular groove, means including a pair of passages in said annular ring each individual to one of said pair of seal retaining grooves for communicating said pair of seal retaining grooves to the source of fluid pressure, each of a pair of resilient O-rings disposed in one of said pair of seal retaining grooves with an interference fit so as to bear radially outwardly against the radially outermost face of that one of said pair of seal retaining grooves with which it is individual, each of said O-rings disposed in blocking relationship with that one of said pair of passages with which it is individual and being deformable into sealing contact with the adjacent wall of the rectangular groove for providing a fluid seal between said annular ring and the walls of the rectangular groove upon actuation of the source of fluid pressure and resiliently returning to its original position upon deactuation of the source of fluid pressure.

5. A ring assembly selectively operable with a source of fluid pressure for providing a seal for a member having an annular rectangular groove comprising an annular ring disposed in clearance relationship in the rectangular groove and having a pair of annular seal retaining grooves each opening on axial opposite sides towards an adjacent wall of the rectangular groove, means operatively associated with said annular ring for communicating said pair of seal retaining grooves to the source of fluid pressure, each of a pair of resiliently deformable members disposed in one of said pair of seal retaining grooves with a radial interference fit and being deformable into sealing contact with the adjacent wall of the rectangular groove for providing a fluid seal between said annular ring and the walls of the rectangular groove upon actuation of the source of fluid pressure and resiliently returning to its original position upon deactuation of the source of fluid pressure.

6. A fluid seal between relatively movable members having annular juxtaposed and spaced radial and axial surfaces comprising
    an annular resiliently deformable element on and having a circumferential interference fit with said axial surface and normally spaced from but proximate to said radial surface;
    means defining an air passage including annular space behind said element and through which fluid under pressure is adapted to pass;
    and means confining said element defining a restricted annular space at the side thereof opposite said axial surface through which fluid in said passage can escape to the space between said surfaces,
        said element being deformable by fluid pressure in said passage and into sealing contact with said radial surface for providing a fluid seal between said axial and radial surfaces and being resiliently returnable to its normal position and away from said radial surface when fluid pressure in said passage is relieved.

7. An air seal between relatively movable members having annular juxtaposed and spaced-apart radial and axial surfaces comprising
    an O-ring on and having a circumferential interference fit with said axial surface and normally disengaged from said radial surface to open the space between said surfaces;
    means defining an air passage which includes annular space behind said O-ring and through which air under pressure is adapted to pass;
    and means confining said O-ring providing restricted space at the side thereof opposite said axial surface through which air in said passage can escape to the space between said surfaces,
        whereby the presence of air under pressure in said passage acts on said O-ring to roll the same forwardly on said axial surface and against said radial surface to close the space therebetween,
        and whereby the relief of air pressure in said passage permits said O-ring to roll back on said axial surface and disengage said radial surface to open the space between said surfaces.

8. An air seal between rotatable and stationary members having adjacent annular relatively spaced radial and axial surfaces comprising
    an O-ring on and in pressed circumferential engagement with said axial surface, said O-ring being normally disengaged from said radial surface to open the space between said surfaces;
    means defining an air passage which includes annular space behind said O-ring and through which air under pressure is adapted to pass;
    and means confining said O-ring providing a restricted annular space at the side thereof opposite said axial surface through which air in said passage can escape into the space between said surfaces,
        whereby the presence of air under pressure in said air passage acts against said O-ring to roll the same on said axial surface and against said radial surface to close the space therebetween,
        and whereby relief of air pressure in said air passage permits said O-ring to roll back on said axial surface to its initial normal position and to open the space between said surfaces.

9. An air seal between adjacent, spaced-apart, rotatable and stationary members, one of said members having a flat annular radial surface and the other of said members having an annular axial surface opposite said radial surface,
    an O-ring surrounded by and having an interference fit with said axial surface and bearing circumferentially under pressure thereagainst, said O-ring being normally spaced from said radial surface to open the space between said members;
    means defining an air passage which includes annular space behind said O-ring and through which air under pressure is adapted to pass;
    and means confining said O-ring providing a restricted annular space radially inwardly thereof through which air in said passage can escape to the space between said members,
        whereby the presence of air under pressure in said passage acts on said O-ring to roll the same forwardly on said axial surface and against said radial surface to close the space between said members,
        and whereby the relief of air under pressure in said passage permits said O-ring to roll back on said axial surface and disengage said radial surface to open the space between said members.

10. A diaphragm chuck having an air cylinder and opposed radial peripheral surfaces,
    a slip ring disposed between and spaced from said radial surfaces with the opposite radial sides thereof confronting respective radial surfaces of said chuck, said sides having axially extending, radially inwardly facing annular surfaces;
    O-rings normally slightly larger in diameter than said annular surfaces seating on and bearing with circumferential pressure against said annular surfaces and normally spaced slightly from the radial surfaces of said chuck;
    means having an air inlet in said slip ring defining an air passage between said air inlet and said air cylinder and communicating with said annular surfaces behind said O-rings;
    and means confining said O-rings providing restricted annular spaces radially inwardly thereof through which air in said passage can escape between said slip ring and said chuck, whereby air under pressure admitted to said passage acts on said O-rings to roll the same outwardly on said annular surfaces to bear against the radial surfaces of said chuck and to close the spaces between said slip ring and said chuck, and whereby relief of air pressure in said passage permits said O-rings to roll back on said annular surfaces and to release the radial surfaces of said chuck.

References Cited in the file of this patent

UNITED STATES PATENTS

| | | |
|---|---|---|
| 728,458 | Hanson | May 19, 1903 |
| 831,603 | Davis | Sept. 25, 1906 |
| 2,477,773 | Soussloff et al. | Aug. 2, 1949 |
| 2,577,656 | Hohwart | Dec. 4, 1951 |
| 2,597,280 | Barnes | May 20, 1952 |
| 3,042,417 | Derman et al. | July 3, 1962 |

FOREIGN PATENTS

| | | |
|---|---|---|
| 963,288 | Germany | May 2, 1957 |